United States Patent
Algers et al.

[11] Patent Number: 6,058,776
[45] Date of Patent: May 9, 2000

[54] CONDUCTIVITY METERING DEVICE

[75] Inventors: Bengt Algers, Nol; Lars-Olof Eriksson, V. Frölunda; Leo Kotkaniemi, Nol, all of Sweden

[73] Assignee: ABS Pump Production AB, Molndal, Sweden

[21] Appl. No.: 09/201,257

[22] Filed: Nov. 30, 1998

[30] Foreign Application Priority Data

Dec. 3, 1997 [SE] Sweden ................................ 9704488

[51] Int. Cl.[7] .................................................... G01F 23/24
[52] U.S. Cl. ........................ 73/304 R; 73/866.5; 340/620
[58] Field of Search ........................... 73/304 R, 866.5, 73/304 C; 340/620

[56] References Cited

U.S. PATENT DOCUMENTS

| | | | |
|---|---|---|---|
| 4,027,172 | 5/1977 | Hamelink | 73/304 R X |
| 4,304,132 | 12/1981 | Snaper | 73/304 R |

FOREIGN PATENT DOCUMENTS

| | | | |
|---|---|---|---|
| 2710872 | 9/1978 | Germany | 73/304 R |
| 196 19 842 | 11/1997 | Germany . | |
| 59-222721 | 12/1984 | Japan . | |
| 281800 | 12/1964 | Netherlands | 73/304 R |
| 627341 | 10/1978 | U.S.S.R. | 73/304 R |

*Primary Examiner*—Hezron Williams
*Assistant Examiner*—Willie Morris Worth
*Attorney, Agent, or Firm*—Pillsbury Madison & Sutro LLP

[57] ABSTRACT

The present invention is for a conductivity metering device. The invention is primarily for conductivity meters which are used for level gauging of fouled liquids where the fouling materials may cause functioning problems of the metering probe. The probe is intended for metering of the conductivity between the probe body 1 and a tube 14, made from metallic material, in order to determine if there is liquid inside the tube. The probe body 1 is the outer tip of a piston 6 and it may be made as one piece with the piston or as a separate part which is mounted onto the piston. The piston 6 and parts connected thereto are movably mounted in the cover part 15 and the cap 8 by sealing slide bearings 4, 7. When metering does not take place the tube 14 is mostly filled with water at a certain overpressure relative to its surroundings. As the metering piston 6 is kept retracted by an active overpressure between the sealings 4 and 7 liquid is prevented from leaking in.

6 Claims, 1 Drawing Sheet

CONDUCTIVITY METERING DEVICE

FIELD OF THE INVENTION

The present invention is for a conductivity metering device. The invention is primarily for conductivity meters which are used for level gauging of fouled liquids where the fouling materials may cause functioning problems of the metering probe.

BACKGROUND OF THE INVENTION

Conductivity meters may be used to check if a liquid has reached a certain level inside a tube, a tank or the like. Metering is not continuous but at predetermined time intervals or occasions. One requirement for use of the method is of course that the liquid has sufficient conductivity and the method is often used for water or water based solutions. For this purpose one meters the current at a given voltage difference between two parts both of which are in the liquid if it has reached the level which is to be checked. One of the parts is often an electrode which is installed for this specific purpose, the other part may be another electrode, in many cases designed to surround the first electrode, or a part of the tube or the tank if these are made from electrically conductive goods. The method may be used both for flowing liquid and still liquid as in a holding tank.

When metering the liquid level inside a tank or a tube made from metal, a metering electrode or probe, which is electrically insulated from the surrounding goods, may be mounted into a tube socket so that the tip or outer end of the probe coincides with the plane of the tube wall or tank wall or slightly protrudes into the tube or the tank. When metering is to be done in heavily fouled liquid such as waste water it might be unsuitable to have parts protruding into the the liquid compartment as this may cause agglomeration of fouling material which stick to that part, which in turn may bring erronous metering results with it. One such application is described in the Swedish patent application no 9701153-0, which deals with evacuation of pumps at start-up. The level in a tube which is connected to the pump is then metered and the start-up procedure is selected due to the metering result. Small particles of fouling material may also adhere as a coating on that part of the surface of the probe which is exposed to the liquid and this may cause similar problems.

SUMMARY OF THE INVENTION

The present invention is for a metering probe for conductivity meters by means of which the above mentioned problems can be avoided. This is achieved thereby that the metering probe always has a metering surface which is clean and free from fouling and coatings. The invention has the charateristics which are mentioned in the claims.

The invention will below be described more in detail with reference to the example of an embodiment thereof which is shown in the enclosed figures.

DETAILED DESCRIPTION OF THE INVENTION

Figure 1:
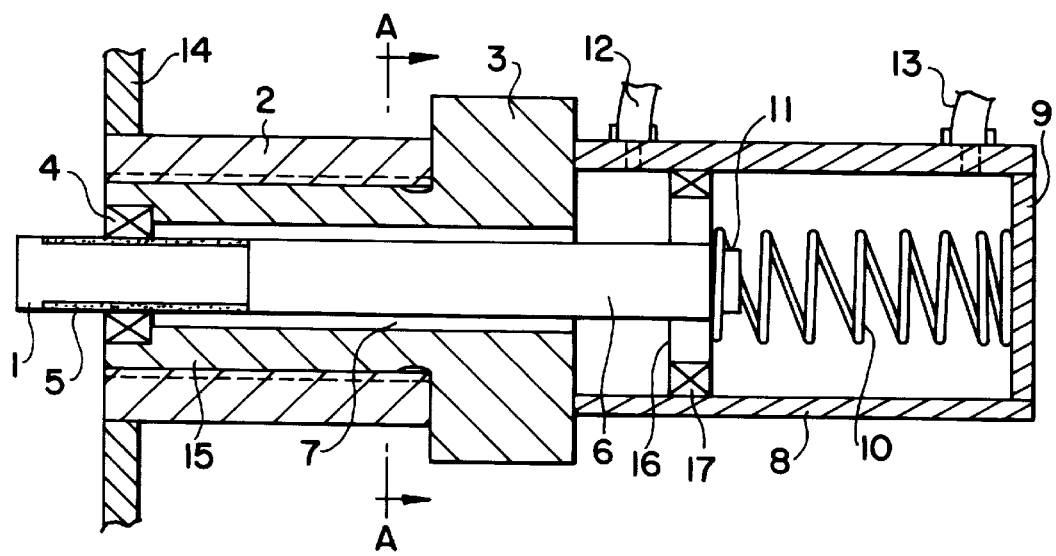
FIG. 1 is a cross-section of a metering probe according to the invention.
Figure 2:
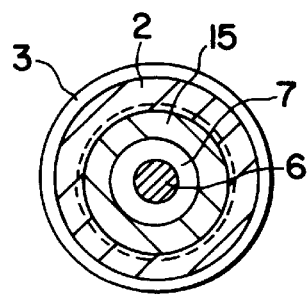
FIG. 2 is a cross-section of the metering probe in a plane A—A of FIG. 1.

The probe which is shown in the figures is intended for metering of the conductivity between the probe body and a tube 14 made from metallic material, in order to determine if there is liquid inside the vertically mounted tube, which is connected to a pump in accordance with the above mentioned Swedish patent application. The probe body is the outer tip of a piston 6 and it may be made as one piece with the piston or as a separate part which is mounted on to the piston. The piston with the probe is mounted into a holder having a forward part 15 and a rear spacing part 3 made as one piece. Reward of the outer tip 1 the piston 6, which is made from electrically conductive, preferably metallic material, has an insulating surface layer 5. Between the piston 6 and the forward part 15 of the holder, there is a space 7.

The outside of the forward part 15 of the holder is threaded and screwed into a tubular socket 2 which is welded or by other means fixed to the wall of the tube 14. In that end of the piston 6 which is opposite to the the probe body there is a plate 16 which is mounted on to the piston 6 and surrounded by a cap 8 having a bottom 9. The piston 6 and parts connected thereto are movably mounted in the forward part 15 and the cap 8 by means of sealing slide bearings 4, 17. The cap 8 and the plate 16 are parts of a pneumatic or hydraulic piston and cylinder arrangement with connecting inlet and outlet openings 12, 13 for pressurised air or other fluid by means of which the piston is actuated and moved. The piston may also be actuated by a spring 10 which bears on the plate 16 and the bottom 9 of the cap.

The metering of the conductivity is between the piston 6 and the tube wall 14. The electrical connections and details which are required for the metering are of well-known kinds and do not form a part of this invention, they are thus not shown in the figures.

When metering is not taking place then the piston is kept in a retracted position so that the tip of it is in the level of the tube wall and the tube gets a smooth surface without protruding objects or pits. This is achieved thereby that an overpressure of air from the inlet 12 is maintained on that side of the plate 16 which is facing towards the piston 6. The overpressure is to be sufficient to overcome the spring force from the spring 10 and to keep the piston in a retracted position. When metering shall take place the inlet 12 is opened so that the overpressure is removed and the piston 6 is pushed into the tube 14 by the force of the spring. Pressurised air may also enter through the inlet 13 at the other side of the plate 16, 7 further increase the force which pushes the piston in the tube. After the metering has been done, renewed overpressure through the inlet 12 causes the piston to return to retracted position. The metering tip 1 then slides against the sealing ring 4 and is scraped clean from fouling and coating so that an exposed metal surface is obtained to ensure that a correct result of the following metering is secured. The sealing ring may in some embodiments be combined with a ring shaped brush or the like in order to further improve the cleaning. The insulating coating 5, which preferably is made from ceramic material, extends itself so far along the piston 6 that when the piston is fully retracted into the tube 14 then the sealing ring 4 contacts the insulating coating which reduces the risk for fluid current between the metering tip 1 and the tube wall 14.

In the situations when metering does not take place, the tube 14 is mostly filled with with water at a certain overpressure relative to its surroundings. As the metering piston 6 is kept retracted by means of an active overpressure between the sealings 4 and 17 water is prevented from leaking in from the tube at the sealing 4. This is essential both to ensure that the movements may function without problems and to avoid erronous metering values which might be caused by water inside the device.

Various embodiments of the invention are possible within the frame of the inventive idea. The movements of the piston may be achived in various ways by pneumatic or hydraulic means, with or without combination with springs or similar mechanical means. It is also possible to achive the movements by electrical means, for example a motor or an electromagnetic device. The movements of the piston may be limited by stop bars or stoppers and the parts of the device may be given various dimensions to be adapted to various applications. The metering tip may be ring-shaped instead of including the whole of the tip of the piston. Both of the electrodes may form parts of the piston and are then preferably made as concentric rings at that part of the piston which passes through the sealing ring 4, to ensure that all metering surfaces are cleaned. Also the material of the metering tip, the piston, the insulating coating, holder and other details is selected in consideration of the liquid in which metering is to be done and other conditions.

We claim:

1. A conductivity metering device mountable in a metallic container for detecting a fluid level of the container, comprising:

a piston forming a part of one of hydraulic and pneumatic piston and cylinder arrangement for disposing in an opening of the container;

a probe body attached to the piston, wherein when the probe body is in an operative position the probe body can be introduced into an inner space of the container so as to detect the presence of fluid contained therein, wherein when the probe body is in a nonoperative position the probe body can be retracted from the inner space of the container and an overpressure is applied to the arrangement so as to prevent fluid from entering into the cylinder;

an insulating coating disposed on an outer surface area of the probe body; and a sealing ring, disposed along an inner surface of the opening, contacting the insulating coating when the probe body is retracted, wherein when the sealing ring contacts the insulating coating during retraction of the probe body, the outer surface of the probe body is cleaned.

2. The conductivity metering device of claim 1, wherein the probe body forms an outer tip of the piston.

3. The conductivity metering device of claim 2, wherein the outer tip of the piston is ring-shaped.

4. The conductivity metering device of claim 1, further comprising a holder disposed in the opening of the container and containing the piston, such that a space is defined between the piston and the holder.

5. The conductivity metering device of claim 1, wherein the insulating coating is formed of a ceramic material.

6. A conductivity metering device mountable in a metallic container for detecting a fluid level of the container, comprising:

a piston forming a part of one of hydraulic and pneumatic piston and cylinder arrangement for disposing in an opening of the container;

a probe body forming a portion of the piston, such that when the probe body is in an operative position the probe body can be introduced into an inner space of the container so as to detect the presence of fluid contained therein, and such that when the probe body is in a nonoperative position the probe body can be retracted from the inner space into an opening of the cylinder, wherein when in the nonoperative position, an overpressure is applied to the arrangement so as to prevent fluid from entering the cylinder, and wherein a single chamber of the metering device houses the probe body and the piston of the one of hydraulic and pneumatic piston and cylinder arrangement;

an insulating coating disposed on an outer surface area of the probe body; and a sealing ring, disposed along an inner surface of the opening of the cylinder, contacting the insulating coating when the probe body is retracted, wherein when the sealing ring contacts the insulating coating during retraction of the probe body the insulating coating of the probe body is cleaned.

* * * * *